United States Patent [19]
Yoshida et al.

[11] 3,723,378
[45] Mar. 27, 1973

[54] METHOD FOR PREPARING PLASTICIZED GRANULAR POLYMERS CONTAINING ACRYLONITRILE AS THE MAIN COMPONENT

[75] Inventors: Masatoshi Yoshida; Minoru Hirai, both of Suntou-gun, Japan

[73] Assignee: Toho Beslon Kabushiki Kaisha, Tokyo, Japan

[22] Filed: Aug. 24, 1971

[21] Appl. No.: 174,330

[30] Foreign Application Priority Data

Mar. 3, 1971 Japan..................................46/11165

[52] U.S. Cl. ...260/30.8 DS, 260/32.6 N, 260/33.6 R, 260/85.5 D, 260/85.5 N
[51] Int. Cl...........................C08f 45/28, C08f 45/46
[58] Field of Search .....260/32.6 N, 33.6 R, 30.8 DS, 260/34.2, 85.5 R, 85.5 D, 85.5 N

[56] References Cited

UNITED STATES PATENTS

| 3,574,177 | 4/1971 | Nakayima | 260/88.7 |
| 3,060,157 | 10/1962 | Goodman | 260/79.3 |
| 3,218,302 | 11/1965 | Melamed | 260/80 |

Primary Examiner—Morris Liebman
Assistant Examiner—Richard Zaitlen
Attorney—Eric H. Waters

[57] ABSTRACT

A method for preparing plasticized granular acrylic polymer is provided. The method comprises polymerizing acrylonitrile or a monomer mixture containing a majority of acrylonitrile with stirring in dispersed state in a ternary system liquid medium comprising at least one non-solvent compound, an organic solvent for acrylic polymers but having no solubility with respect to said compound, and water. The non-solvent compound is a saturated hydrocarbon having five to 10 carbon atoms. The resulting granular polymer each grain of which has approximately 0.1 mm. to 4 mm. diameter is preferably dried in vacuo at a temperature below 60°C after separation from the dispersion polymerization reactant system. If necessary, it may be subjected further to heat treatment at a temperature below 100°C in a sealed vessel. The resulting granular polymer is not necessarily to be subjected to plasticization which is completed by means of said organic solvent and can be subjected directly to semi-melt spinning with the use of an extruder.

8 Claims, 1 Drawing Figure

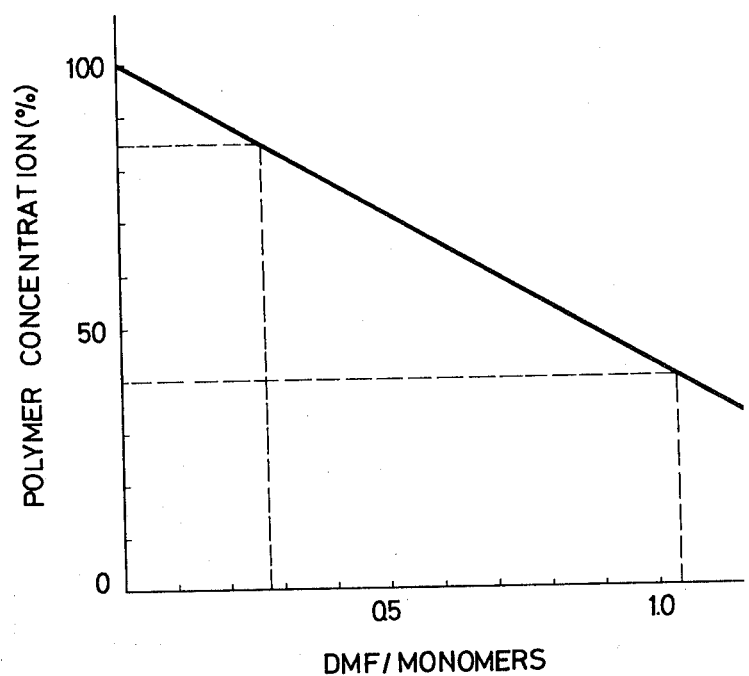

METHOD FOR PREPARING PLASTICIZED GRANULAR POLYMERS CONTAINING ACRYLONITRILE AS THE MAIN COMPONENT

The invention relates to a method for preparing plasticized "acrylic" polymer in granular form, and more particularly to a method of the above by polymerizing acrylonitrile or a mixture of monomers containing a majority of acrylonitrile with stirring in dispersed state in a particular liquid medium system so that there is no need for further plasticizing of the resulting granular polymer which may be subjected as is and directly to semi-melt spinning.

Polyacrylonitrile or copolymers of acrylonitrile, which are to be formed from a mixture of monomers containing acrylonitrile monomer in majority, have been used for a long time in various fields, and above all for spinning acrylic fibers. Such polymers and copolymers shall be called herein "acrylic polymers."

According to one of the conventional acrylic fiber spinning methods, pulverized acrylic polymer having been obtained by means of suspension polymerization is mixed with an organic solvent to be plasticized and then the plasticized polymer is subjected to so-called "-semi-melt spinning." Such conventional plasticizing method, however, has disadvantages in that the separate plasticization step must be done after the polymerization, in that it is difficult to uniformly impregnate acrylic polymer powder with the solvent to realize homogeneous plasticizing, and in that the plasticized polymer is apt to be a slurry or wet powder which causes difficulty in handling the plasticized polymer to be spun, and above all in case of the semi-melt spinning with the use of an extruder because such moist polymer material will not be smoothly fed in the extruder and will not smoothly fall down from the hopper.

A principal object of the invention is, therefore, to provide a method for preparing plasticized acrylic polymer while fully obviating the disadvantages inevitable in the conventionally plasticized polymer.

A further object of the invention is to provide a plasticized acrylic polymer in granular form so as to be convenient for handling thereof, and more particularly for semi-melt spinning.

According to the invention, the above and other various objects can be attained by polymerizing acrylonitrile or a mixture of monomers containing a majority acrylonitrile with stirring and in dispersed state in a ternary system liquid medium comprising a saturated hydrocarbon having five to 10 carbon atoms as a non-solvent, an organic solvent for the acrylic polymers as having no solubility to said hydrocarbon, and water.

The viscosity of the reactants is increased as the polymerization proceeds but the degree of the viscosity increase is not so considerable in the dispersion polymerization of the invention as in comparison with that in the usual solution polymerization so that the reaction heat may be easily removed in the invention. Consequently the polymerization can be carried out homogeneously and can be well controlled at a predetermined temperature. Since there is no need for adding any emulsifying agent in the invention, troublesome washing or rinsing treatments are not necessary. The granular dimension of the acrylic polymer of the invention ranges approximately from 0.1 mm. to 4 mm. in diameter. After completion of the polymerization, the resulting polymer can be quite easily removed from the reactant system. The granular polymer is preferably plasticized by means of the organic solvent so that it may be subjected directly to semi-melt spinning using an extruder. The dried granular polymer has an angle of repose less than 45° and thus very smoothly falls down from the hopper into the extruder. Of course, the granular polymer of the invention may be mixed a solvent to be spun with wet or dry spinning.

It is preferable to charge the liquid medium comprising the non-solvent compound, the organic solvent and water firstly into the sealed reaction vessel provided with an agitator therein and then, after the charge has been heated up to near the reaction temperature, to add thereto the mixture of the monomers and a catalyst or polymerization initiator so as to proceed with the polymerization reaction with stirring at a temperature below 60°C.

As for the monomers to be copolymerized with the acrylonitrile, any of the monomers capable of being copolymerized therewith and having been generally used for that purpose may be used, among which are acrylic ester, methacrylic ester, acrylic amide, vinyl acetate, vinyl chloride, styrene or like unsaturated ethylenic compounds, as neutral monomers; and ethylene sulfonic acid, allyl sulfonic acid, methallyl sulfonic acid, acrylic acid, styrene, sulfonic acid, and ammonium potassium or sodium salt thereof, as acidic monomers; and 2-methyl-5-vinylpyridine, vinyl imidazole and derivatives thereof, as basic monomers.

As for the organic solvent, dimethyl formamide (DMF), dimethyl sulfoxide (DMSO), ethylene carbonate (EC), γ-buthyrolactone and other organic solvents for the acrylic polymers can be used if it is not soluble to the non-solvent.

As for the non-solvent, pentane, hexane, heptane, cyclohexane, octane, nonane, decane and other saturated alicyclic hydrocarbons of five to 10 carbon atoms may be used if it has no solubility to said organic solvent and water. Above all, those of a relatively low boiling point are preferable since they can be easily separated from the resulting polymer after the completion of the reaction.

When the non-solvent compound is used in the reaction system in too small an amount, the viscosity of the reactants will be raised so much that it will become difficult to agitate the reactant system to be homogeneous and remove the heat of the reaction and consequently to obtain the objective polymer in the desired granular form. On the contrary, when too much is added, the excessive amount will not only not contribute to promote the effect of the invention but also various disadvantages from an economical view point such as that an unnecessary larger vessel must be provided, will be brought about. It is preferable, thus, to select the weight ratio of the non-solvent to the monomers in a range of 2.5 to 5.0.

The weight ratio of the organic solvent to the monomers affects in general various properties of the resulting polymer, above all the melting point and melt viscosity, although it varies depending on the desired conversion or polymerization yield. If it is lower than 0.1, the spinability of the polymer would be considerably lessened, but when it exceeds the value of 1.2 the molecular weight is so low that the ability of the polymer to be spun desiredly or spinability is deteriorated. Thus, the ratio by weight with respect to the organic solvent preferably ranges from 0.1 to 1.2 relative to the monomers.

The presence of water in the reaction system exerts an important influence on attainment of the purposes of this invention. The concentration of the organic solvent is preferably selected within the range of between 97 and 83 percent. If the organic solvent is added excessively, i.e., in a concentration higher than 97 percent, the plasticized polymer is produced in the form of too fine granules so that the granular dimension will not reach the desired diameter ranging from 0.1 to 4 mm. suitable for semi-melt spinning. If the concentration is set lower than 83 percent, the resulting polymer will not allow the plasticized granular acrylic polymer to be homogeneous. When the concentration is far lower, the polymer can not be obtained in the granular form. The presence of water is further advantageous in view of the fact that acrylonitrile is copolymerized more readily with the other monomer, that separation of the plasticized granular polymer after completion of the reaction is made easy and that it is made possible to use an inorganic initiator which is not soluble to the organic solvent.

The polymerization reaction may be carried out in the presence of the initiator. It is preferable to use a radical polymerization initiator having a sufficient activity at a relatively low temperature, which is for instance 2,2'-azobis (2,4-dimethyl) valeronitrile, azobisiso-butyronitrile, diisopropylpercarbonate, persulfate-sulfite or the like.

The polymerization reaction is carried out with vigorously stirring so that the organic solvent in which the monomers are uniformly dissolved is sufficiently dispersed in the non-solvent which quantitatively occupies the biggest part of the reaction system. Meanwhile granules of the polymer are formed by and in the suspension reactant system for several hours so that the reaction is completed. The stirring condition exerts an influence directly on the diameter of the plasticized polymer granules. The diameter tends to become smaller, as the stirring is made stronger or at a higher speed. For obtaining plasticized polymer granules of which the mean diameter ranges from 0.1 mm. to 4 mm. suitable for being subjected to the semi-melt spinning, polymerization reaction should be carried out under a stirring condition of 100 to 600 rpm. with an anchor type stirrer in which the dimension ratio of the width to the diameter of the stirrer blade is 0.6.

The resulting plasticized granular polymer has an angle of repose of less than 45° and can fall smoothly down in a hopper. Therefore, the polymer is suitable above all as raw material to be subjected to semi-melt spinning. The granular polymer has further advantages owing to its high apparent specific gravity in that deaeration before the spinning is made easy, and thus operation stability during the spinning is increased.

According to the invention, the polymerization reaction is generally carried out at a temperature lower than 60°C. This temperature is not critical, but if it is too high undesirable coloration will occur.

After the reaction having been completed, the produced plasticized polymer can be easily separated from the reaction system since the granules will be precipitated owing to the gravity when the stirring is stopped. The separated polymer granules hold a small amount of non-solvent, unreacted monomers and initiator which adhere thereon, as impurities which may be one of the causes of filament breaking during the subsequent spinning step by forming bubbles when heated in the melted polymer. The adhere impurities might be gradually evaporated even when leaving the produced polymer as it is, but it is preferable to treat the resulting granular polymer under a reduced pressure to rapidly and effectively remove the undesired impurities. This treatment can be carried out for instance at a temperature lower than 60°C and under pressure lower than 500 mm.Hg, and, if desired, by further heating at a temperature lower than 100°C to decompose the remaining initiator. In connection with this treatment, it is necessary to decide the treatment condition lest the content of the organic solvent impregnated in each of the polymer granules should be decreased.

In the accompanying drawing, there is shown the relationship between the ratio of the organic solvent to the monomers supplied to the reaction system before the polymerization and the polymer concentration in the reaction system after the polymerization has been completed. The results were obtained by carrying out polymerization reactions according to the method disclosed in Example 3 to be given hereinafter in which dimethylformamide was used as the organic solvent so as to attain a conversion or polymerization yield of 70 percent but by variously changing the weight ratio between the organic solvent and the monomers. As can been seen from the graph, for instance, a resulting reaction system containing the polymer in concentration of 40 to 50 weight percent can be prepared by setting the ratio between dimethylformamide and the monomers in the range of 0.27 to 1.04, as shown with dotted lines.

The plasticized granular polymer prepared according to the invention will be generally melted at a temperature with the range of from 100° to 230°C although may vary depending on composition and molecular weight of the polymer perse, kind and content of the organic solvent and the like, and thus is preferable for use as a raw material for semi-melt spinning.

Owing to the higher polymer concentration in the spinning dope obtained by merely heating and melting the polymer obtained according to the invention relative to that of the conventional spinning dopes for the dry or wet spinning, the resulting fibers are of dense and compact structure so that they have a desirable sheen and there will not occur any deviltrification during the spinning. Further, the productivity is improved and recovering of the solvent and the like is easy and can be done at a relatively low cost, by virtue of the high polymer concentration thereof.

The invention will be elucidated by referring to the following Examples.

EXAMPLE 1

163g of n-hexane and 40.5g of 93 percent aqueous solution of dimethylformamide were charged and heated in a 500 cc capacity sealed glass vessel having a stirrer therein.

When the temperature of the mixture reached about 50°C, 40g of acrylonitrile, 3g of methylacrylate and 0.34g of 2,2'-azobis (2,4-dimethyl) valeronitrile were added to said mixture, and then the polymerization reaction was carried out for 7 ½ hours with stirring (400 rpm.). During the reaction, the temperature was kept at 50 ± 1°C.

After the polymerization reaction was completed, the stirring was stopped to precipitate the produced granular polymer. The resulting product was filtered and dried under the reduced pressure of 400 mm.Hg to obtain 63g of the plasticized granular polymer of which molecular weight was 78,000. Each particle of the granular polymer was substantially spherical having a mean diameter of 1.23 mm. (conversion: 68 percent, angle of repose: 35°).

The plasticized polymer was melted at 129°C and the ability to be spun was found to be desirable. The polymer concentration in the melted composition was 47 percent.

EXAMPLE 2

Polymerization reactions were carried out similarly as in Example 1, excepting that hexane, heptane, cyclohexane, nonane and pentane were respectively used as the non-solvent, and that amounts of water and monomer compositions were variously changed. The results are shown in Table I.

glass flask having a stirrer therein. When the temperature of the mixture reached about 55°C, 53g of acrylonitrile, 4g of methylacrylate and 0.85g of 2,2'-azobis (2,4-dimethyl) valeronitrile were added to the mixture and the resulting mixture was kept for 8 hours at 55 ± 1°C with stirring (350 rpm.).

Thereafter, stirring was stopped to filter out and obtain the precipitating granular polymer which was treated at 45°C under the reduced pressure of 450 mm.Hg to remove unreacted monomers and n-hexane, and further treated at 60°C for 2 hours to decompose 2,2'-azobis (2,4-dimethyl) valeronitrile used as the catalizer.

The molecular weight of the polymer, each particle of which was of spherical shape having a mean diameter of 0.5mm, was 78,000 (conversion: 87 percent, angle of repose 36.5°C). The polymer was melted at 162°C and showed a desirable ability to be spun (polymer concentration: 46.8 percent).

EXAMPLE 5

40Kg of n-hexane, 5,5kg of 94.5 percent aqueous solution of dimethylformamide were charged into a glass lined polymerization vessel having a stirrer therein to heat the mixture. When the temperature of

TABLE I

| | | | Properties of polymer composition | | | | | |
|---|---|---|---|---|---|---|---|---|
| Non-solvent | Content DMF (percent) | Composition of monomer (AN/MA) | Particle size, mm.φ | Molecular weight | Conversion, percent | Melting temperature, °C. | Concentration of polymer, percent | Angle of repose, degrees |
| n-Hexane | 92.1 | 75/5 | 1.40 | 74,500 | 68.3 | 132 | 42.0 | 38.7 |
| Do | 95.5 | 90/10 | 1.10 | 72,400 | 70.2 | 108 | 44.9 | 37.8 |
| Heptane | 95.1 | 93/7 | 0.60 | 72,100 | 70.7 | 129 | 45.1 | 37.1 |
| Cyclohexane | 93.1 | 95/5 | 1.30 | 74,100 | 71.2 | 133 | 45.3 | 37.2 |
| Nonane | 85.6 | 93/7 | 0.12 | 75,200 | 69.1 | 127 | 43.5 | 37.9 |
| Pentane | 89.0 | 92/8 | 0.23 | 74,300 | 70.2 | 124 | 44.7 | 37.8 |
| Referencial examples: | | | | | | | | |
| n-Hexane | 82.0 | 95/5 | | 76,000 | 70.7 | 130 | | |
| Cyclohexane | 80.1 | 93/7 | 0.23 | 78,000 | 73.8 | 120 | | |

AN = Acrylonitrile.
MA = Methylacrylate.
DMF = Dimethylformamide.
DMF/Monomer = 37.6/43.

EXAMPLE 3

160g of n-hexane, 37.7g of 92.8 percent aqueous solution of dimethylformamide were charged and heated in a 500 cc capacity sealed glass vessel having a stirrer therein.

When the temperature of the mixture reached about 55°C, 40g of acrylonitrile, 2g of methylacrylate and 0.4g of azobisisobutyronitrile were added to the mixture and the polymerization reaction was carried out for 7 hours with stirring (350 rpm.). During the reaction, the temperature was kept at 55 ± 1°C.

After the reaction was completed, the stirring was stopped to precipitate the produced granular polymer, the molecular weight of which was 79,900. Each polymer particle was substantially spherical having a mean diameter of 1.50 (conversion: 70 percent).

The plasticized polymer melted at 138°C, when heated (polymer concentration: 50.1 percent).

EXAMPLE 4

228g of n-hexane, 59g of 96.5 percent aqueous solution of γ-butyrolactone were charged and heated in a the mixture reached about 47°C, to the mixture 10.1Kg of acrylonitrile, 0.9Kg of methylacrylate and 0.165Kg of 2,2'-azobis (2,4-dimethyl) valeronitrile were added. The polymerization reaction was carried out for 9 hours with stirring (250 rpm.). During the reaction, the temperature was kept at 47.0 ± 1°C.

Thereafter, the stirring was stopped and then the reaction products in the vessel were discharged and treated by a separator to obtain the granular polymer. The resulting polymer was heated at 40°C under the reduced pressure of 400 mm.Hg to remove and recover n-hexane and un-reacted monomers and then further heated at 60°C for 2 hours to decompose the 2,2'-azobis (2,4-dimethyl) valeronitrile which was used as the catalizer.

The molecular weight of the resulting polymer, each particle of which had a mean diameter of 1,1 mm, was 72,000 (conversion: 86.0 percent, angle of repose: 36.1°). The plasticized polymer melted at 170°C (polymer concentration: 65.0 percent) and showed a desirable ability to be spun.

EXAMPLE 6

Polymerization reactions were carried out in accordance with the method just as given in Example 4, excepting that n-hexane was used as the non-solvent and dimethylsulfoxide, ethylene carbonate, γ-butyrolactone, and dimethylformamide were used as the organic solvent, respectively. The results are shown in Table II.

TABLE II

| Organic solvent | Molecular weight | Conversion | Melting temperature | Polymer concentration | Angle of repose |
|---|---|---|---|---|---|
| DMSO | 63000 | 94.2% | 152.0 | 48.5% | 35.9 |
| E. C. | 112000 | 93.5 | 180 | 48.3 | 34.8 |
| γ-butyrolactone | 78000 | 87.0 | 162 | 46.8 | 36.5 |
| DMF | 42100 | 74.9 | 148 | 42.8 | 38.9 |

DMSO: Dimethylsulfoxide EC: Ethylene carbonate DMF: Dimethylformamide

EXAMPLE 7

228g of n-hexane, 64g of dimethylformamide and 0.4g of ammonium persulfate were charged and heated in a 500 cc capacity glass vessel having a stirrer therein.

When the temperature of the mixture reached about 50°C, 53g of acrylonitrile, 4g of methylacrylate and a solution of 0.57g sodium sulfite in 7g water were added and then the polymerization reaction was carried out for 8 hours at 45 ± 1°C with stirring (400 rpm.).

Thereafter, the stirring was stopped to enable separating and obtaining plasticized granular polymer.

The molecular weight of the polymer which was of spherical shape and had a mean diameter of 0.2mm. was 47,000 (conversion: 8.38 percent).

What we claim is:

1. A method for preparing plasticized granular acrylic polymer, comprising the steps of polymerizing monomers containing acrylonitrile as the main component thereof in a dispersed state in the presence of water and an organic solvent for acrylic polymers in the form of an aqueous solution of 97 to 83 percent organic solvent and a saturated hydrocarbon of five to 10 carbon atoms having no solubility with respect to water and the organic solvent but having solubility with respect to the monomers, the weight ratio of said organic solvent to the monomers being 0.1 to 1.2 and the weight ratio of the hydrocarbon to the monomers being 2.5 to 5.0, and separating the resulting plasticized granular polymer from the reaction system.

2. The method as claimed in claim 1, wherein the organic solvent is a compound selected from the group consisting of dimethylformamide, dimethylsulfoxide, ethylene carbonate and γ-butyrolactone.

3. The method as claimed in claim 1, wherein the saturated hydrocarbon is a compound selected from a group of pentane, hexane, heptane, cyclohexane, octane, nonane and decane.

4. The method as claimed in claim 1, further comprising a step of purifying the thusly produced polymer.

5. The method as claimed in claim 4, wherein the purifying is carried out by treating the produced polymer under a reduced pressure and at a temperature lower than 60°C.

6. The method as claimed in claim 5, wherein the thusly resulting treated polymer is further treated at a temperature lower than 100°C in a sealed vessel.

7. The method as claimed in claim 1, further comprising the steps of adding an organic solvent for acrylic polymers to the separated plasticized granular polymer and homogenously mixing the organic solvent with the polymer to prepare the polymer solution.

8. The method as claimed in claim 7, wherein the organic solvent is a compound selected from a group consisting of dimethylformamide, dimethylsulfoxide, ethylene carbonate and γ-butyrolactone.

* * * * *